United States Patent
Garakani et al.

(10) Patent No.: US 7,299,295 B1
(45) Date of Patent: Nov. 20, 2007

(54) HIGH-SPEED DIAL-UP MODEM SESSION STARTUP METHOD AND APPARATUS

(75) Inventors: Mehryar Khailili Garakani, Los Angeles, CA (US); Herbert M. Wildfeuer, Santa Barbara, CA (US); Gavin Jin, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 821 days.

(21) Appl. No.: 09/715,438

(22) Filed: Nov. 16, 2000

(51) Int. Cl.
*G06F 15/16* (2006.01)
(52) U.S. Cl. .................. 709/237; 370/900; 709/227
(58) Field of Classification Search .......... 370/352, 370/392, 516, 900; 375/216, 223, 261; 709/201–253
See application file for complete search history.

(56) References Cited

U.S. PATENT DOCUMENTS

| | | | | |
|---|---|---|---|---|
| 5,751,701 A | * | 5/1998 | Langberg et al. | 370/281 |
| 5,754,589 A | * | 5/1998 | Maitra et al. | 375/216 |
| 6,449,269 B1 | * | 9/2002 | Edholm | 370/352 |
| 6,504,838 B1 | * | 1/2003 | Kwan | 370/352 |

OTHER PUBLICATIONS

International Telecommunication Union; "Series V: Data Communication Over the Telephone Network"; Feb. 1998; Version 8; pp. 1-19.

* cited by examiner

*Primary Examiner*—George C. Neurauter, Jr.
(74) *Attorney, Agent, or Firm*—Marger Johnson & McCollom, P.C.

(57) ABSTRACT

A method for establishing a high-speed modem relay connection over a voice frame network between an originating modem with an associated calling-leg gateway and an answering modem with an associated called-leg gateway is described. The method includes determining at a predeterminedly early time during end-to-end physical layer negotiations between the originating modem and the answering modem whether both modems are high-speed modems, with the determining being performed by one or more of the associated gateways. If so then the method further includes terminating end-to-end physical layer negotiations between the originating modem and the answering modem, with the terminating being performed by one or more of the associated gateways. Finally, the method includes negotiating local physical layer on either end of the connection between the originating modem and the calling-leg gateway and the answering modem and the called-leg gateway. By this method, the calling-leg gateway serves as proxy for the answering modem and the called-leg gateway serves as proxy for the originating modem. Modem relay connection apparatus for use in a voice frame network gateway to establish a data channel between two modems is also described. The apparatus includes an amplitude-modulated answer (ANSam) tone detector; a signal suppression mechanism responsive to said tone detector for suppressing signals between the modems to terminate end-to-end negotiation between the two modems; a code detector for detecting a digital call menu (CM) code responsive to an amplitude-modulated answer tone; and a proxy negotiation mechanism responsive to said code detector for negotiating a local physical layer between the gateway and a local one of the two modems.

6 Claims, 2 Drawing Sheets

HIGH-SPEED DIAL-UP MODEM SESSION STARTUP METHOD AND APPARATUS

BACKGROUND OF THE INVENTION

The present invention relates generally to voice frame network systems such as Voice over Internet Protocol (VoIP) systems for concurrently carrying both voice and data signals, and more particularly it concerns method and apparatus for transitioning a high-speed data channel from voice mode to modem relay mode during session startup.

VoIP is widely deployed by Internet Service Providers (ISPs) and within large or distributed private enterprises. Because voice channels require low latency for audio continuity and understanding in human conversation, typical VoIP implementations have utilized low-latency mechanisms such as Real-time Transfer Protocol (RTP). Unfortunately, the voice mode of VoIP channels that use RTP is an unreliable transport mechanism for high-speed modem signals. High packet drop rates and frequent retrains cause undesirable deterioration of the signal when high-speed modem signals are carried over a standard VoIP channel.

SUMMARY OF THE INVENTION

A method for establishing a high-speed modem relay connection over a voice frame network between an originating modem with an associated calling-leg gateway and an answering modem with an associated called-leg gateway is described. The method includes determining at a predeterminedly early time during end-to-end physical layer negotiations between the originating modem and the answering modem whether both modems are high-speed modems, with the determining being performed by one or more of the associated gateways. If so then the method further includes terminating end-to-end physical layer negotiations between the originating modem and the answering modem, with the terminating being performed by one or more of the associated gateways. Finally, the method includes negotiating local physical layer parameters on either end of the connection between the originating modem and the calling-leg gateway and the answering modem and the called-leg gateway. By this method, the calling-leg gateway serves as proxy for the answering modem and the called-leg gateway serves as proxy for the originating modem.

Modem relay connection apparatus for use in a voice frame network gateway to establish a data channel between two modems includes an amplitude-modulated answer (ANSam) tone detector; a signal suppression mechanism responsive to said tone detector for suppressing signals between the modems to terminate end-to-end negotiation between the two modems; a code detector for detecting a digital call menu (CM) code responsive to an amplitude-modulated answer tone; and a proxy negotiation mechanism responsive to said code detector for negotiating a local physical layer between the gateway and a local one of the two modems.

DETAILED DESCRIPTION OF THE INVENTION

Figure 1:
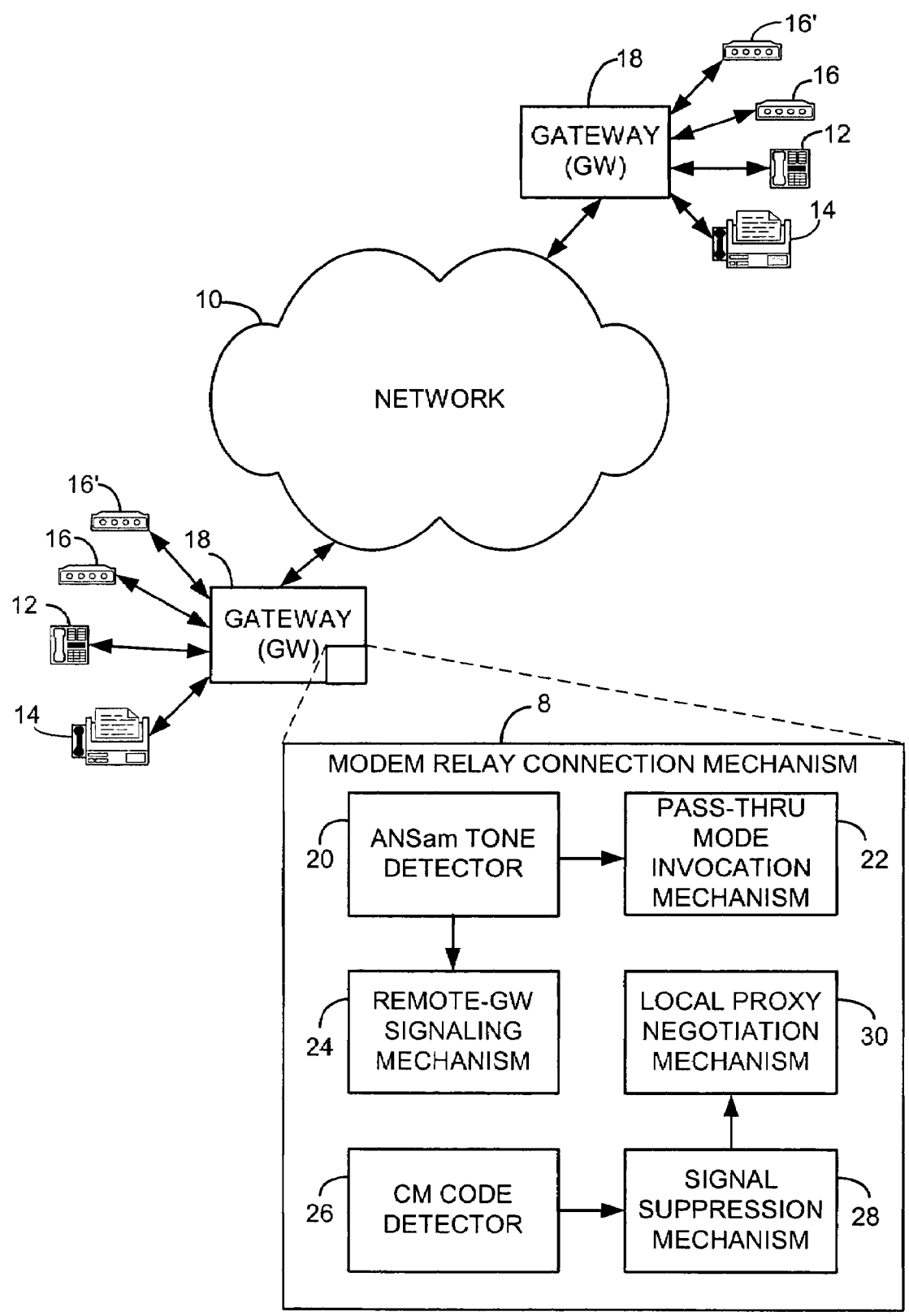
FIG. 1 is a system block diagram illustrating a VoIP network in which the high-speed dial-up modem startup apparatus is featured in accordance with a preferred embodiment of the invention.

FIG. 1 illustrates the invented apparatus 8 coupled with a network 10 operating with respect to voice traffic thereon in accordance with a voice packet protocol such as a voice over frame relay (VoFR) protocol or voice over Internet protocol (VoIP). Network 10 typically includes one or more telephone handsets 12, one or more fax machines 14 and one or more low-speed modems 16 representing different traffic demands on network 10 due to their diverse bandwidth requirements. The faxes 14 and low-speed modems 16 often share telephone numbers with the telephone handsets to provide facsimile, e-mail and Internet service to users/clients. High-speed modems 16' having data rates of 32 k-56 k bits/second (bps) or higher are typically provided, and are the type of high-speed modems with which the invention finds particular utility.

Handsets 12 communicating voice require relatively low bit rates of only approximately 2.4-4.8 k bits/second. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, VoIP channels using RTP or other low-latency protocols represent an unreliable transport for high-speed signaling between high-speed modems 16'. Conventionally, in a VoIP network 10, high-speed modems 16' would have negotiated an end-to-end physical layer, e.g. V.34, and gateways 18 would have been passive enablers of the resulting voice mode VoIP connection which is subject to high packet drop rates and frequent retrains.

A solution to the problem described above is to terminate the physical layer, e.g. V.34, at the VoIP gateway, and to packetize and transmit the demodulated data bit stream over the IP network to the peer gateway where it is reconstructed and forwarded to the receiving modem. This is referred to as a modem relay mode of operation. By monitoring physical layer negotiation between the originating and answering endpoints during a predeterminedly early phase of the end-to-end negotiation between endpoints, it is determined whether the endpoints are modems negotiating a high-speed dial-up connection. If so, the VoIP gateways take over the end-to-end negotiation of the physical layer, terminating the physical layer locally on their adjacent telephony segment.

Modem relay startup must first determine that the originating and answering modems are high-speed modems through appropriate tone detection sensitive enough to distinguish low-speed modem 16 and fax 14 signals from high-speed modem 16' dial-up connections. It must then smoothly transition to modem relay mode at an appropriate time and in a non-disruptive manner during the sensitive end-to-end physical layer negotiation. For example, consider an enterprise with a dial-up server or machine S in a central office at location X and an employee at home who tries to make a dial-up connection from the employee's client end-station or machine C at location Y.

Assume the dial-up connection is made through a phone company P that provides the dial-up connection over a phone company P VoIP network. Such a call would have three segments:

a) Segment 1: a telephony segment from client C to phone company P (e.g. local loop on the client end). This will be referred to herein as the calling leg.

b) Segment 2: a VoIP segment within phone company P.

c) Segment 3: a telephony segment from phone company P to server S (e.g. local loop on the server end). This will be referred to herein as the called leg.

Further assume that server machine S and client machine C are connected to the dial-up circuit through a high-speed V.34 modem 16' and that initially the VoIP channel is in voice mode.

Figure 2:
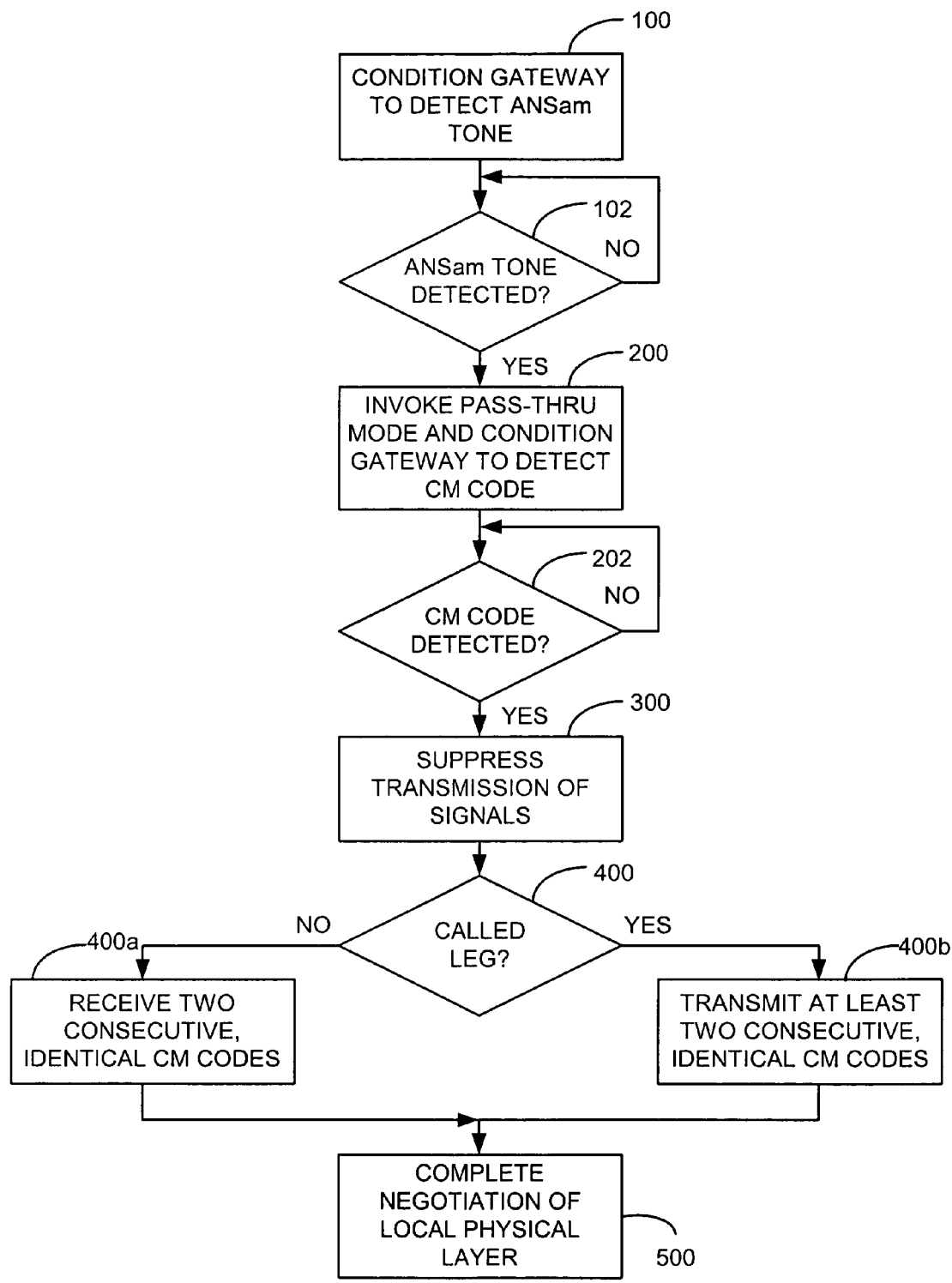
FIG. 2 is a flowchart of the voice mode-to-modem relay mode transition method in accordance with a preferred embodiment of the invention.

FIG. 2 is a flowchart illustrating the high-speed modem relay connection method in accordance with a preferred embodiment of the invention. The invented high-speed dial-up modem session startup method proceeds in five numbered steps as follows:

1) A VoIP gateway on the called leg is conditioned to detect an ITU-T V.8 amplitude-modulated answer tone (ANSam) signal on the stream at least from server machine S's modem to the VoIP gateway. Those of skill in the art will appreciate that detecting the ANSam signal is a strong indication that the answering modem (e.g. the server machine S modem in this example) supports high-speed dial-up connection via a V.34 or higher speed modem, e.g. V.90. The evolving ITU-T Recommendation V.8 (hereinafter the V.8 standard) is described in a February 1998 publication of the International Telecommunication Union entitled *Series V. Data Communication Over The Telephone Network* and subtitled *Procedures For Starting Sessions Of Data Transmission Over The Public Switched Telephone Network.*

In accordance with the preferred embodiment of the invention, either gateway is conditioned to detect ANSam. Occasionally, ANSam echoes back from a call-originating modem to the call-answering modem that generated the ANSam signal. Due to needed high-sensitivity in the tone detectors, ANSam then may be detected at either end. Because the earliest possible detection of ANSam is desired, in accordance with the invention, the gateways of both the called leg and the calling leg are conditioned to detect ANSam. The first gateway to detect ANSam then simply signals the other gateway that ANSam has been detected. Those of skill in the art will appreciate that such signaling may be performed in any suitable manner, e.g. via known out-of-band gateway-to-gateway signaling techniques.

Step 1 including ANSam tone detection is illustrated in FIG. 2 at 100 and 102.

2) As soon as the ANSam signal is detected, the channel is placed in a passthrough state by disabling voice compression and echo cancellation. This is accomplished preferably at both gateways, whereby the ANSam signal-detecting gateway signals the other gateway and both gateways proceed as follows. Voice compression is disabled (i.e. the channel is required to switch over to uncompressed G711 mode), assuming compression previously was enabled. (Those of skill in the art will appreciate this allows the least amount of distortion in the modem signals on the channel.) Also, voice echo cancellation is disabled, assuming it previously was enabled in voice mode. (Those of skill will appreciate that during the modem physical layer training phase, the modems configure their own echo cancellation parameters, which are used subsequently by the modems for echo cancellation.)

Next, and as part of step 2, the VoIP gateway on the calling leg is conditioned to detect a V.8 call menu (CM) signal identifying a modem (a digital code generated by a high-speed originating modem to indicate the fact) on the stream arriving from the originating modem on the calling leg. This is a further indication that modem relay transition is desired because it indicates that the originating modem is a high-speed modem. (Those of skill in the art will appreciate that detection of a V.8 CM signal is important in accordance with the preferred embodiment of the invention by brief consideration of the case where the originating modem is V.32 and the answering modem is V.34. In such case, ANSam would be generated on the called leg, but there would be no CM generation.)

Those of skill in the art will appreciate that, in accordance with the preferred embodiment of the invention, both gateways are conditioned to detect CM even though it is the calling leg that generates CM. It is within the spirit and scope of the invention, however, to condition only the called-leg gateway to detect CM, assuming the called-leg gateway can be identified with sufficiently high probability.

Step 2 including CM code detection is illustrated in FIG. 2 at 200 and 202.

3) Upon CM detection, the CM-detecting gateway silences or suppresses transmission of modem signals to the other leg. This is to avoid undesirable end-to-end negotiation between the two modems that would otherwise result if successive identical CMs generated by the caller modem were received by the answering modem (which under a typical protocol would respond with a V.8 joint menu (JM) signal or code). The phenomenon whereby CM undesirably reaches the far end is referred to herein as CM leakage from the calling leg to the called leg. In accordance with the invention in its preferred embodiment, CM leakage is avoided.

Step 3 is illustrated in FIG. 2 at 300.

4) After signal suppression, the VoIP gateways undertake physical layer negotiation, effectively usurping the modems' normal role and preventing the modems from completing end-to-end negotiation. Those of skill in the art will appreciate that, by this time, the originating and answering modems already are partway through V.34 Phase 1 negotiation, which was conducted end-to-end by the modems via exchange of ANSam and CM. In accordance with the invention, the V.34 stacks on the VoIP gateways accommodate for this fact as follows.

4a) On the calling leg, the VoIP gateway acts like an answering modem in Phase 1 but begins with a local truncated V.34 Phase 1 negotiation. Phase 1 negotiation is continued by the gateway at the point subsequent to generation of the ANSam signal (i.e. the gateway need not generate any additional ANSam tones). The gateway awaits two additional CMs from the originating modem (e.g. the client machine C modem, in this example). When two additional identical CMs are received, the calling-leg gateway proceeds with the rest of V.34 Phase 1 and subsequent physical layer startup as usual (i.e. as specified in the V.8 standard).

Step 4*a*, including determining which leg gateway 18 is in, is illustrated in FIG. 2 at 400 and 400*a*.

4b) On the called leg, the VoIP gateway acts like an originating modem in Phase 1 but begins with a local truncated V.34 Phase 1 negotiation. Phase 1 negotiation is continued by the gateway at the point subsequent to generation of CM since the answering modem (e.g. the server machine S modem, in this example) already has generated ANSam. Thus, the called-leg gateway begins generating at least two identical CMs immediately and proceeds with the rest of Phase 1 and subsequent physical layer startup as usual (i.e. as specified in the V.8 standard).

Step 4b is illustrated in FIG. 2 at 400b.

5) With the transition complete, local physical layer negotiation on Segment 1 (between client machine C modem and its associated VoIP gateway) and Segment 3 (between server machine S modem and its associated VoIP gateway) have supplanted the initial end-to-end negotiation between the two modems. A modem relay session is established end to end in the form of a high-speed dial-up connection that is far more reliable than traditional voice mode connections within VoIP networks.

Step 5 is illustrated in FIG. 2 at 500.

In accordance with a preferred embodiment of the invention, CM signal tone detection in step 2) above may be performed as follows. The VoIP gateway demodulates the bit stream and looks for a specific bit pattern identifying modem CM. In the case of a V.8 modem, the bit pattern is 1111111111 0000001111 0100000111. The leading twenty bits represent the CM/JM wake-up and synchronize header. The trailing ten bits include an information octet (framed by start and stop bits) that represents the call function and V-Series modem type. The modem type should be V.34 or higher speed modem 16', in accordance with the invention.

Referring again now to FIG. 1, apparatus 8 will be described in more detail. Apparatus 8, which may be thought of as a modem relay connection mechanism, includes an ANSam tone detector 20; a pass-through (pass-thru) mode invocation mechanism 22; and preferably also a remote-gateway (remote-GW) signaling mechanism 24. Apparatus 8 also includes a CM code detector 26; a signal suppression mechanism 28; and a local proxy negotiation mechanism 30. As will be understood from the above description of the invented method, ANSam detector 20 causes pass-through mode invocation mechanism 22 to disable voice compression and echo cancellation if either or both are determined to have been enabled. ANSam detector 20 also causes remote-GW signaling mechanism 24 to signal the remote gateway 18 connected to the far-end modem. Those of skill in the art will appreciate that it is not yet determined to a high degree of certainty that both modems are high-speed.

Upon detection of a CM code by code detector 26, the transition to modem relay mode may begin, since detection of a CM code by either gateway 18 indicates that a high-speed modem 16' has received an ANSam from another high-speed modem 16' in accordance with the V.34 protocol. Thus, CM code detector 26 causes a signal suppression mechanism 28 immediately to suppress further signals between high-speed modems 16', effectively terminating the end-to-end physical layer negotiations therebetween. Once signals have been suppressed—at what is referred to herein as a predeterminedly early time in the end-to-end negotiations—local proxy negotiation mechanism 30 transmits or detects consecutive identical CM codes, as described above, and then completes local physical layer negotiation in accordance with the high-speed, dial-up V.34 modem protocol.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

The invention claimed is:

1. A method, comprising:
    initially setting a voice over packet channel to voice mode at an originating gateway;
    determining that a modem calling the gateway is a high speed modem;
    determining if the channel has at least one of either voice echo cancellation or voice compression is enabled;
    disabling voice compression and voice echo cancellation, if enabled;
    enabling modem echo cancellation;
    suppressing modem signals from the high speed modem from being transmitted by the originating gateway to a receiving modem through a receiving gateway;
    negotiating with the high-speed modem to establish the connection, wherein the negotiation is a truncated, V.34 Phase 1 negotiation such that the originating gateway negotiates with the high-speed modem instead of allowing the high-speed modem to negotiate with the receiving modem; and
    upon completion of the negotiating, establishing a modem relay connection.

2. The method of claim 1, wherein determining that the modem is a high speed modem further comprises detecting a V.8 call menu.

3. The method of claim 1, wherein negotiating with the high-speed modem further comprises:
    performing a local, truncated phase 1 negotiation under International Telecommunication Union (ITU) standard V.34;
    receiving two identical call menus from the high-speed modem;
    completing the phase 1 negotiation and a physical layer startup under ITU standard V.8.

4. An apparatus, comprising:
    a processor to set a voice over packet channel to voice mode at an originating gateway;
    a code detector to determine that a modem calling the gateway is a high speed modem;
    a signal suppression mechanism to suppress signals between the high speed modem and a receiving modem;
    a pass-through mode invocation mechanism to:
        determine if the channel has at least one of either voice echo cancellation or voice compression is enabled;
        disable voice compression and voice echo cancellation, if enabled; and
        enable modem echo cancellation; and
    a proxy negotiation mechanism to negotiate with the high-speed modem to establish the connection and establish a modem relay connection, wherein the negotiation is a truncated, V.34 Phase 1 negotiation in which the proxy negotiation mechanism negotiates with the high-speed modem instead of allowing the high-speed modem to negotiate with the receiving modem.

5. The apparatus of claim 4, wherein the code detector to determine that the modem is a high speed modem is further to detect a V.8 call menu.

6. The apparatus of claim 4, wherein the proxy negotiation mechanism to negotiate with the high-speed modem is further to:

receive two identical call menus from the high-speed modem;

complete the phase 1 negotiation and a physical layer startup under ITU standard V.8.

* * * * *